(12) United States Patent
Shenoy

(10) Patent No.: US 10,693,371 B2
(45) Date of Patent: Jun. 23, 2020

(54) METHOD AND APPARATUS FOR PEAK SWITCHING TO REDUCE LOSSES IN HIGH FREQUENCY DC-DC CONVERTERS

(71) Applicant: Texas Instruments Incorporated, Dallas, TX (US)

(72) Inventor: Pradeep S. Shenoy, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 9 days.

(21) Appl. No.: 14/448,959

(22) Filed: Jul. 31, 2014

(65) Prior Publication Data
US 2016/0036312 A1 Feb. 4, 2016

(51) Int. Cl.
*H02M 3/156* (2006.01)
*H02M 1/00* (2006.01)

(52) U.S. Cl.
CPC .... *H02M 3/156* (2013.01); *H02M 2001/0058* (2013.01); *Y02B 70/1425* (2013.01); *Y02B 70/1491* (2013.01)

(58) Field of Classification Search
CPC ...................................................... H02M 3/156
USPC ............................................ 323/282; 363/41
See application file for complete search history.

(56) References Cited

U.S. PATENT DOCUMENTS

| | | | | |
|---|---|---|---|---|
| 2004/0070377 A1* | 4/2004 | Bai | ..................... | H02M 3/1588 323/282 |
| 2009/0033299 A1* | 2/2009 | Ishino | ................. | H02M 3/1588 323/282 |
| 2010/0020573 A1* | 1/2010 | Melanson | ................. | H01F 3/10 363/41 |
| 2010/0026259 A1* | 2/2010 | Ozaki | ................... | H02M 3/156 323/282 |

FOREIGN PATENT DOCUMENTS

CN 101199105 A 6/2008

OTHER PUBLICATIONS

Chu-Yi Chiang and Chern-Lin Chen, Senior Member, IEEE, IEEE Transactions on Power Electronics, vol. 24, No. 9, Sep. 2009.*
The State Intellectual Property Office of P.R. C, Search Report dated Oct. 16, 2018.

* cited by examiner

*Primary Examiner* — Daniel Kessie
*Assistant Examiner* — Trinh Q Dang
(74) *Attorney, Agent, or Firm* — Dawn Jos; Charles A. Brill; Frank D. Cimino

(57) ABSTRACT

A method includes monitoring a resonant interval across a switching node. The method also includes detecting one or more preset values associated with the resonant interval across the switching node. The method further includes, in response to detecting the one or more preset values associated with the resonant interval across the switching node, initiating a high switch into an "on" operation.

16 Claims, 3 Drawing Sheets

US 10,693,371 B2

METHOD AND APPARATUS FOR PEAK SWITCHING TO REDUCE LOSSES IN HIGH FREQUENCY DC-DC CONVERTERS

TECHNICAL FIELD

This disclosure is generally directed to buck topologies. More specifically, this disclosure is directed to a method and apparatus for peak switching in order to reduce losses in a buck-based DC-DC converter during a high frequency discontinuous conduction mode (DCM) operation.

BACKGROUND

A buck converter is a voltage step-down and current step-up converter that provides an efficient mechanism to reduce the voltage of a DC power supply. In a buck converter, the current in an inductor is often controlled by two switches, typically a transistor and a diode.

SUMMARY

This disclosure provides a method and apparatus for peak switching during a discontinuous conduction mode (DCM) operation in a buck converter.

In a first example, a method includes monitoring a resonant interval across a switching node. The method also includes detecting one or more preset values associated with the resonant interval across the switching node. The method further includes, in response to detecting the one or more preset values associated with the resonant interval across the switching node, initiating a high switch into an "on" operation.

In a second example, an apparatus includes a buck converter and a controller. The buck converter is configured to be coupled to a power supply and includes a switching node, a first transistor, and a second transistor. The controller is configured to monitor a resonant interval across the switching node. The controller is also configured to detect one or more preset values associated with the resonant interval across the switching node. The controller is further configured, in response to detecting the one or more preset values associated with the resonant interval across the switching node, initiate the first transistor into an "on" operation.

In a third example, a buck converter circuitry includes a switching node, a first transistor, and a second transistor. The buck converter circuitry also includes control circuitry configured to monitor a resonant interval across the switching node. The control circuitry is also configured to detect one or more preset values associated with the resonant interval across the switching node. The control circuitry is further configured, in response to detecting the one or more preset values associated with the resonant interval across the switching node, initiate the first transistor into an "on" operation.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
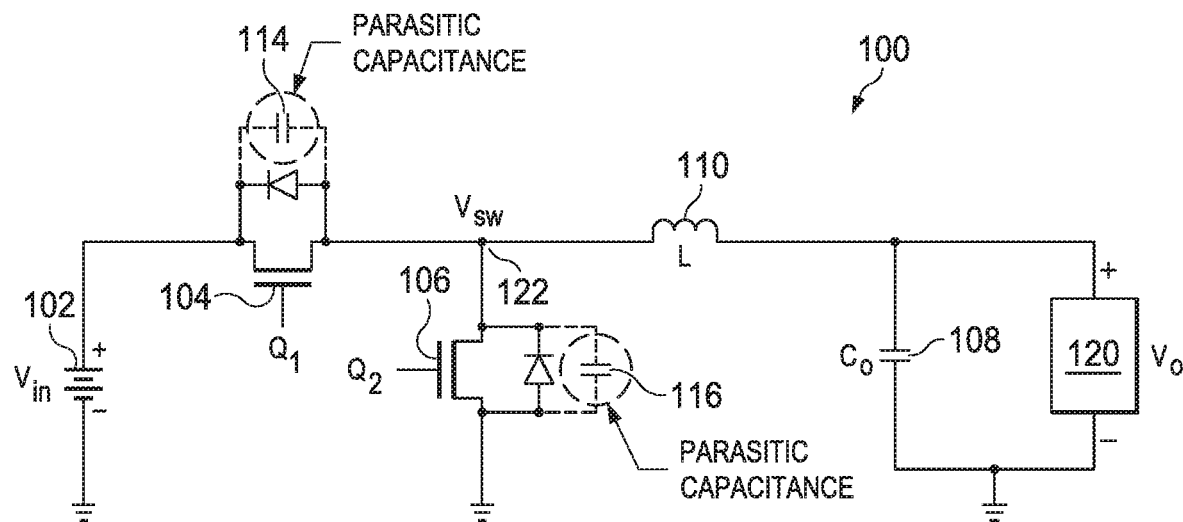
FIG. 1 illustrates an example buck converter topology in accordance with this disclosure.

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

In a buck converter with two switches and an inductor, there is typically both a direct current (DC) and a ripple current in the inductor such that the sum of the two currents creates a triangular waveform. In the inductor (as in many power converter topologies), it is often desirable that the average current remains constant, sometimes referred to as continuous conduction mode. That is, in continuous conduction mode, the current through the inductor continuously cycles between upper and lower values around an average value. For example, in a continuous conduction mode having a 10 A±1 A cycle, the upper and lower values are 11 A and 9 A around an average of 10 A. As another example, in a continuous conduction mode having a 0 A±1 A cycle, the upper and lower values are +1 A and −1 A around an average of 0 A. In the latter example, current flow in the inductor changes direction during the cycle.

The continuous conduction mode can be achieved in a buck converter by performing the same operations, cycle to cycle. For example, at the beginning of a cycle, the first switch is turned on, and current rises in the inductor. At the end of the rise, the first switch is turned off and the second switch is turned on, and the current decays in the inductor to the starting point.

In some buck converter topologies, it is desirable for the current in the inductor to always flow in one direction. Thus, the second example above in which the current through the inductor cycles between −1 A and +1 A (with an average of 0 A) may be undesirable. Instead, it can be desirable for the current to always be greater than or equal to 0 A. When the current is just above 0 A. To achieve this, when the current is positive and decays to zero, the second switch can be shut off right around the time the current gets to zero. However, when the second switch is shut off, the remaining current still has to flow somewhere. In some buck converter topologies, the current flows to another diode. It should be understood that in synchronous buck converters (such as both high side and low side switches using MOSFETs), when the inductor current nears zero and the low side switch is turned off, the current will flow through the low side switch's body diode.

The opening of the second switch when the current in the inductor decays to zero is one example of discontinuous conduction mode (DCM) operation. In DCM, the steady state of the operation is changed so that the operation is no longer considered to be a continuous conduction mode. In the buck converter described above, this change can be triggered by an event in which the current reversal in the inductor is intentionally avoided. To avoid a current reversal, the current decay can be detected and, as soon as the current gets to zero, the second switch is shut off. Hence, DCM refers to the interruption of the continuous conduction mode cycle of a buck converter by shutting off the buck converter low side switch in order to avoid a current reversal in the inductor.

With a buck-based DC/DC converter, when a switching frequency is increased into a high frequency (HF) range, switching losses can increase. In fact, energy losses that can occur during a switching transition can be so large that HF operation is prevented. However, operating DC/DC converters at HF can be desirable in order to reduce the physical size of the converter.

This disclosure describes embodiments of high frequency (HF) DC/DC buck converter topologies with switch actions timed such that the high side switch turns on with low voltage across it. The minimum voltage across the switch can occur when the switching node voltage moves towards its peak voltage during a resonant interval in DCM. It should be understood that resonance occurs due to the interaction of the output inductor and the switches' parasitic output capacitance acting for example as an inductor capacitor circuit. The embodiments disclosed here are applicable to various power systems, such as those utilizing buck converters. However, it will be understood that the disclosed embodiments may be applicable in other types of systems, as well. For example, a similar technique can be used to boost converters for valley switching.

FIG. 1 illustrates an example buck converter topology 100 according to this disclosure. It should be noted that the example buck converter topology 100 illustrated in FIG. 1 is for illustration only. Other embodiments of the buck converter topology 100 can be used without departing from the scope of this disclosure.

As shown in FIG. 1, the buck converter topology 100 can include a power supply 102 that provides an input supply voltage $V_{in}$. The buck converter topology 100 can also include two transistors $Q_1$ 104 and $Q_2$ 106. Each of the two transistors $Q_1$ 104 and $Q_2$ 106 can have parasitic capacitances 114 and 116, respectively. The buck converter topology 100 can further include a capacitor $C_o$ 108, an inductor L 110, and an output 120. Furthermore, the buck converter topology 100 can have a switching node $V_{SW}$ 122.

Figure 2:
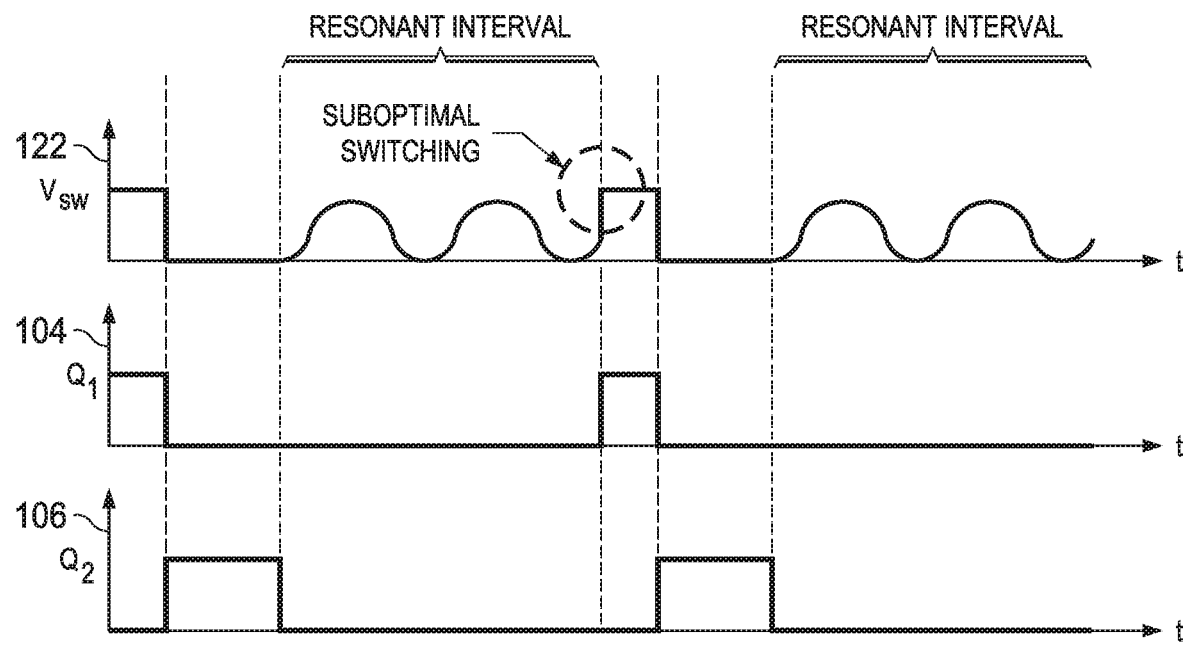
FIG. 2 illustrates an example graph of resonant intervals across a switching node and two transistors in accordance with this disclosure.

The transistors $Q_1$ 104 and $Q_2$ 106 each can have a parasitic capacitance. As shown in FIG. 1, when operating in DCM, the inductor L 110 and each of the parasitic capacitances 114 and 116 can resonate as both converter switches are off. Without any additional processing circuitry, switching can occur at a suboptimal point where there is a relatively large voltage across the high side switch or the transistor $Q_1$ 104. FIG. 2 illustrates an example graph of resonant intervals across a switching node $V_{SW}$ 122 and the two transistors $Q_1$ 104 and $Q_2$ 106 illustrated in FIG. 1 according to this disclosure. Specifically, FIG. 2 illustrates an example when switching during resonant intervals is suboptimal. As shown in FIG. 2, switching can occur at a time when the voltage at the switching node $V_{SW}$ is far from or is not increasing to a maximum or crest such that a relatively high voltage is present across the switch or transistor $Q_1$ 104. Thus, at the time of switching, such that the high switch or transistor $Q_1$ 104 is turned on, energy losses can occur due to the relatively large voltage across the switch.

Figure 3:
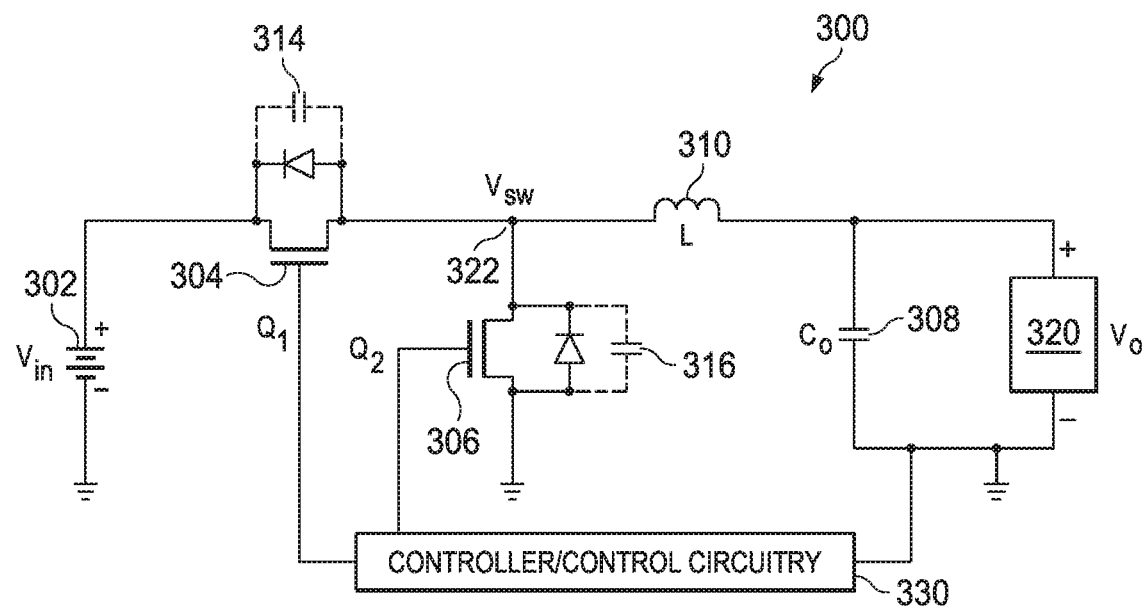
FIG. 3 illustrates an example buck converter topology in accordance with this disclosure.

FIG. 3 illustrates an example buck converter topology 300 according to this disclosure. Similar to FIG. 1, the buck converter topology 300 can include a power supply 302, two transistors $Q_1$ 304 and $Q_2$ 306, each having a parasitic capacitance 314 and 316, respectively, as well as a capacitor $C_o$ 308, an inductor L 310, and an output 320. The buck converter topology 300 can also have a switching node $V_{SW}$ 322 so that the inductor L 310 connects to the transistor $Q_2$ 306.

Additionally, buck converter topology 300 can include a controller/control circuitry 330. The controller 330 can be configured to intelligently time the high side switch "turn-on" to occur when the switching node voltage is about to reach or does reach a maximum or peak voltage. The transistors $Q_1$ 304 and $Q_2$ 306 each can have a parasitic capacitance. As shown in FIG. 3, when operating in DCM, the inductor L 310 and each of the parasitic capacitances 314 and 316 can resonate as both converter switches are off. The controller 330 can cause switching to occur at an optimal point where there is not a relatively large voltage across the high side switch or transistor $Q_1$ 304.

For example, the controller 330 can be configured to monitor a resonant interval across a switching node (such as the switching node $V_{SW}$ 322). When the controller 330 detects that the resonant interval across the switching node is associated with one or more preset values, the controller 330 can be configured to initiate the high switch or transistor $Q_1$ 304 into an "on" operation. In an embodiment, the one or more preset values can be a voltage threshold. For example, when the resonant interval across the switching nodes is above a threshold voltage (such as at, near, or approaching a maximum), such that the voltage across the switch is low, the controller 330 can be configured to initiate the high switch or transistor $Q_1$ 304 into an "on" operation.

In an embodiment, the one or more preset values can be an output of a derivative function. The derivative function can provide an output of a positive value, negative value, or zero indicative of the voltage value across the switching node. For example, the controller 300 can be configured to initiate the high switch or transistor $Q_1$ 304 into an "on" operation in response to receiving a signal from a peak detection circuit, which looks at the derivative of the voltage. Subsequently, the controller 330 can be configured to initiate the high switch or transistor $Q_1$ 304 into an "off" operation and the low switch or transistor $Q_2$ 306 into an "on" operation. The controller 330 can also be configured to initiate the low switch or transistor $Q_2$ 306 into an "off" operation.

Figure 4:
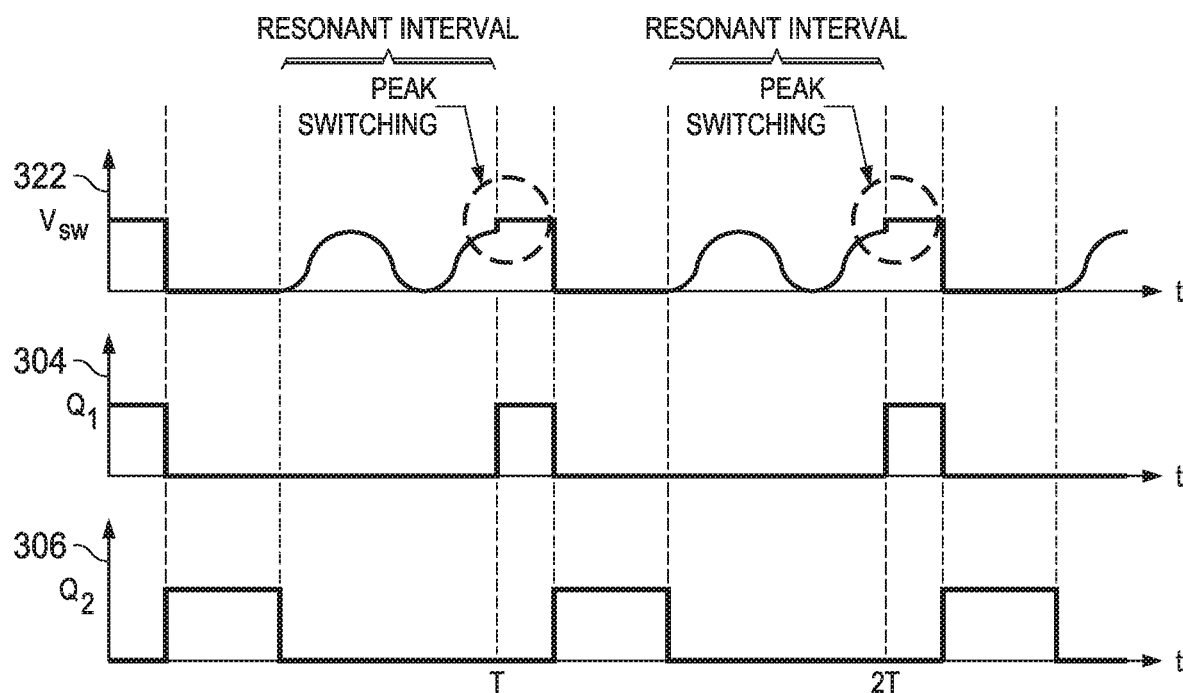
FIG. 4 illustrates an example graph of resonant intervals across a switching node and two transistors in accordance with this disclosure.

FIG. 4 illustrates an example graph of resonant intervals across the switching node $V_{SW}$ 322 and the two transistors $Q_1$ 304 and $Q_2$ 306 illustrated in FIG. 3 according to this disclosure. Specifically, FIG. 4 illustrates an example when switching during resonate intervals occurs at, near, or approaching an optimal position. As shown in FIG. 4, switching can occur at a time when the voltage at the switching node $V_{SW}$ 322 is approaching a maximum or crest (such as a peak position) such that a relatively low voltage is present across the switch. Thus, at the time of switching, such that the high switch or transistor $Q_1$ 304 is turned on, energy losses can be reduced or minimized due to the relatively low voltage across the switch. Subsequently, turning the high switch or transistor $Q_1$ 304 to an "off" state and the low switch or transistor $Q_2$ 306 to an "on" state can also result in additional energy losses.

The controller 330 can be configured to regulate output voltage by selectively choosing resonant peaks (such as dithering) so that switching does not occur at every resonant peak. Dithering can be used to achieve an average peak value over a series of peaks in order to regulate output voltage. The controller 330 can be configured to initiate the first transistor into the "on" operation at a preset value associated with a first peak at a first percentage of the first peaks and at a preset value associated with a second peak at a second percentage of the second peaks. For example, the controller 330 can be configured to initiate the high switch or transistor $Q_1$ 304 into the "on" operation during the first peak 40% of the time and into the "on" operation during the second peak 60% of the time in order to regulate the output voltage. In one embodiment, the first transistor remains in the "on" operation for a time duration (as shown in FIG. 4, the time period of transistor $Q_1$ 304 when it is turned on) that is less than the time duration of the resonant peak, for example 40% or 60% of the duration of the first and second peaks, as explained above.

In an embodiment, the controller 300 can initiate the high switch or transistor $Q_1$ 304 into an "on" operation based on a timer. For example, after a predetermined time has passed since the high switch or transistor $Q_1$ 304 was previously turned "on," (or the power supply 102 begins to provide a voltage) the controller 330 can be configured to turn "on" the high switch or transistor $Q_1$ 304.

The controller can initiate the high switch or transistor $Q_1$ 304 into an "on" operation based on the timer in conjunction with the controller 330 detecting that the resonant interval across the switching node is associated with the one or more preset values. For example, after a predetermined time has passed, the controller 300 can wait until the resonant interval across the switching node is associated with the one or more preset values before initiating the high switch or transistor $Q_1$ 304 into an "on" operation.

The controller can initiate the high switch or transistor $Q_1$ 304 into an "on" operation based on the timer in conjunction with dithering. For example, after a predetermined time has passed, the controller 300 can wait until the resonant interval across the switching node is associated with the one or more preset values before initiating dithering to control when the high switch or transistor $Q_1$ 304 operation is turned "on."

Figure 5:
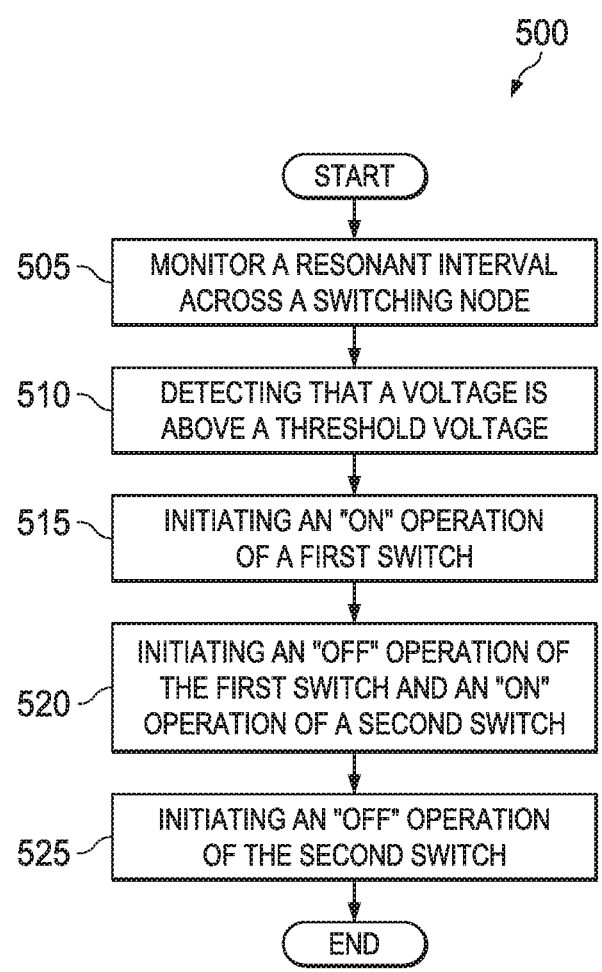
FIG. 5 illustrates an example method for switching in a buck converter in accordance with this disclosure.

FIG. 5 illustrates an example method 500 for switching in a buck converter according to this disclosure. At step 505, the controller 330 can monitor a resonant interval across a switching node. At step 510, the controller 330 can detect that a voltage of the resonant interval across the switching node is above a threshold voltage. In an embodiment, the threshold voltage can be a peak voltage across the resonant interval.

At step 515 the controller 330 can initiate a high switch or transistor $Q_1$ 304 into an "on" operation. For example, the controller 330 can be configured, in response to detecting that the voltage of the resonant interval across the switching node is above the threshold voltage, to initiate the high switch or transistor $Q_1$ 304 into an "on" operation. At step 520, the controller 330 can initiate the high switch or transistor $Q_1$ 304 into an "off" operation and the low switch or transistor $Q_2$ 306 into an "on" operation. At step 525, the controller 330 can initiate the low switch or transistor $Q_2$ 306 into an "off" operation.

Although FIG. 5 illustrates one example of a method 500 for peak switching in a buck converter topology 300, various changes may be made to FIG. 5. For example, while FIG. 5 illustrates a series of steps, various steps in each figure could overlap, occur in parallel, occur in a different order, or occur any number of times. Also, one or more of the steps of the method 500 could be removed, or other steps could be added to the method 500.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
monitoring a first resonant interval and a second resonant interval across a switching node;
detecting a first resonant peak associated with the first resonant interval, and a second resonant interval associated with the second resonant interval across the switching node; and
in response to detecting each of the first resonant peak and the second resonant peak, initiating a high switch into an "on" operation, wherein a percentage of time of the high switch in the "on" operation is different with respect to the first resonant peak and the second resonant peak.

2. The method of claim 1, wherein the first resonant peak and the second resonant peak are one of voltage values and derivatives of voltage values.

3. The method of claim 1, wherein the high switch is initiated into the "on" operation after detecting the first resonant peak or the second resonant peak at least twice.

4. The method of claim 1, further comprising initiating the high switch into an "off" operation after initiating the high switch into the "on" operation.

5. The method of claim 1, wherein initiating the high switch into the "on" operation comprises initiating the high switch into the "on" operation in response to detecting that the first resonant peak or the second resonant peak is approaching a maximum.

6. The method of claim 1, wherein the high switch is initiated into the "on" operation after a predetermined time.

7. The method of claim 1, wherein said monitoring includes monitoring a sequence of first resonant intervals and a sequence of second resonant intervals across the switching node and selectively ignoring some resonant intervals of each of the sequence, and wherein initiating the high switch into the "on" operation comprises initiating the high switch into the "on" operation during each resonant interval next following each ignored resonant interval.

8. The method of claim 4, further comprising initiating a low switch into an "on" operation while initiating the high switch into the "off" operation.

9. An apparatus comprising:
 a buck converter configured to be coupled to a power supply, the buck converter comprising a switching node, a first transistor, and a second transistor; and
 a controller configured to:
  monitor a resonant interval across the switching node,
  detect a resonant peak associated with the resonant interval across the switching node, and
  in response to detecting the resonant peak, initiating the first transistor into an "on" operation, wherein the first transistor remains in the "on" operation for a time duration that is less than the time duration of the resonant peak.

10. The apparatus of claim 9, wherein the resonant peak is one of voltage values and derivatives of voltage values.

11. The apparatus of claim 9, wherein the controller is configured to initiate the first transistor into the "on" operation after detecting the resonant peak at least twice.

12. The apparatus of claim 9, wherein the controller is further configured to initiate the first transistor into an "off" operation and initiate the second transistor into an "on" operation.

13. The apparatus of claim 9, wherein the controller is further configured to initiate the second transistor into an "off" operation.

14. The apparatus of claim 9, wherein the controller is configured to initiate the first transistor into the "on" operation in response to detecting that the resonant peak is approaching its maximum value.

15. The apparatus of claim 9, wherein the controller is configured to initiate the first transistor into the "on" operation after a predetermined time.

16. The apparatus of claim 9, wherein said controller is configured to monitor a sequence of resonant intervals across the switching node and selectively ignore some resonant intervals of the sequence, and wherein the controller is configured to initiate the first transistor into the "on" operation during each resonant interval next following each ignored resonant interval.

* * * * *